United States Patent Office 3,207,730
Patented Sept. 21, 1965

3,207,730
POLYMERS COMPRISING A FLUORINATED QUATERNARY SALT OF AN AMINE-SUBSTITUTED ACRYLIC ACID ESTER
Richard A. Guenthner, St. Paul, Minn., assignor to Minnesota Mining & Manufacturing Company, St. Paul, Minn., a corporation of Delaware
No Drawing. Filed Sept. 28, 1962, Ser. No. 227,082
10 Claims. (Cl. 260—79.3)

This invention relates to new and useful fluorinated quaternary salts. In one aspect this invention relates to fluorinated unsaturated quaternary salts. In another aspect, this invention relates to fluorinated quaternary salts in polymeric form.

Each year considerable quantites of gasoline and other volatile petroleum products are lost through evaporation. Evaporation losses occur at the well, the refinery, the tank farm, during transportation and from the consumer's storage tank. These losses can be reduced by the use of expensive vapor control tanks, but the capital investment makes such a solution impractical in many situations. In addition to the loss itself, evaporation causes a change in composition of the remaining petroleum which can undesirably affect its quality. Moreover, the escaping vapors can constitute a serious fire hazard and contribute to air pollution. Similar problems exist with other volatile liquids, including water. As a result, considerable efforts have been exerted to find satisfactory materials for use in minimizing evaporation losses.

In the treatment of fabrics and various other surfaces to impart both water and oil repellency properties, various fluorine containing acrylates and acrylate polymers have been suggested. Generally, such fluorinated polymeric materials have limited, if any, solubility in water and are applied to fabric, leather and other surfaces in solution in suitable organic solvents. Because of the convenience, low cost, non-toxicity, nonflammability and other obvious inherent advantages of water as a vehicle, it has been desired to prepare fluorinated chemicals with water miscibility in addition to the ability to provide oil and water repellency to the various substrates treated therewth.

It is therefore an object of this invention to provide new and useful fluorinated quaternary salts and polymers thereof.

Another object of this invention is to provide methods for the preparation of these new and useful fluorinated quaternary salts and polymers thereof.

A further object of this invention is to provide substrates, including various fabrics, leather and the like, with oil and water repellency properties.

Yet another object of this invention is to provide a process for treating various substrates to impart oil and water repellency properties thereto, which process may use an aqueous solution of a fluorinated quaternary salt.

Still another object of this invention is to provide a water soluble, highly fluorinated polymer capable of imparting oil and water repellency properties to fabrics, leather and other surfaces.

The fluorinated quaternary salts of this invention have the formula

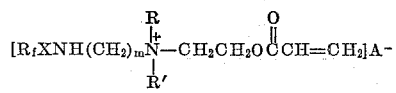

where X is either —SO$_2$— or

$m$ is an integer from 2 to 11, preferably 2 to 6, and R and R' are stable oleophilic aliphatic or aromatic radicals having from 1 to 17 carbon atoms. For example, R and R' may be alkyl, cycloalkyl, alkaryl, aryl or aralkyl radicals, preferably alkyl radicals having from 1 to 6 carbon atoms (e.g. methyl, ethyl, propyl, butyl, amyl or hexyl). R$_f$ may be aliphatic C$_n$F$_{2n+1}$ or cycloaliphatic C$_n$F$_{2n-1}$, where $n$ is an integer from 1 to 18, preferably from 2 to 12. A is an anion, such as a halogen anion (fluorine, chlorine, bromine or iodine), a sulfate anion, or a hydroxyl anion, but is preferably chlorine.

These quaternary salts can be prepared by reacting, usually at an elevated temperature, the corresponding tertiary amine (e.g. the tertiary amines of U.S. 2,759,019 and 2,764,603) with chloroethylacrylate, as illustrated by the equation

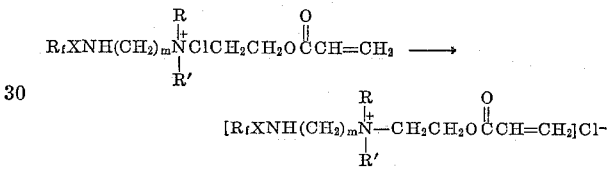

The reaction is generally conducted in the presence of an organic solvent, such as dimethylformamide, preferably at temperatures above room temperature to increase the rate of reaction. The other halide salts can be readily prepared from the chloride, and the hydroxides can be obtained by reacting the halide salts with an aqueous suspension of silver oxide to form a solution of the hydroxide, i.e. the free quaternary base, which can be filtered to remove the insoluble silver halide reaction product and any unreacted silver oxide. This solution can be distilled under high vacuum to obtain the free base, but the aqueous hydroxide solution can be directly utilized when added to an aqueous system.

For evaporation inhibition the above unsaturated quaternary compounds may be added to the system at concentrations ranging from about 0.0001% to about 0.01% by weight, usually below about 0.003%. They may be added as a solid, a water solution, a methanol solution, an isopropanol solution; and as an isopropanol-gasoline solution.

These quarternary compounds slowly polymerize upon standing at room temperature or above to produce useful polymeric products. They may also be copolymerized using vinyl addition techniques with other unsaturated polymerizable compounds, such as the fluorinated acrylates of U.S. 2,642,416, U.S. 2,803,615, and U.S. 2,839,-513. Such homopolymers and copolymers with other fluorinated acrylates are characterized by their outstanding oil and water repellency properties and can be used as coatings or impregnants for textiles, glass, metals, plastics, etc. The lower molecular weight polymers having high occurrence of quaternized side groups are water miscible and are good gasoline evaporation inhibitors. By appropriate selection of the polymerizable comonomer and its mol ratio in the final polymer, the properties of the copolymers may be suitably adjusted as desired. High molecular weight polymers may also be prepared by polymerizing 2-chloroethyl acrylate, either alone or with another suitable copolymerizable monomer, and reacting a tertiary amine with the chloroethyl group, as set forth earlier in equation form. These techniques of forming quaternized sidechains attached to the main carbon chain through 2-chloroethylacrylate groups provides the structure

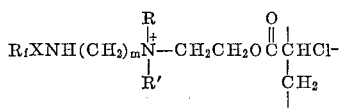

The following examples are presented for purposes of illustration and not necessarily for limiting the scope of this invention.

EXAMPLE 1

To a glass flask was charged 900 grams (6.7 mols) of chloroethyl acrylate, 3,340 grams (6.0 mols) of $$C_7F_{15}CONHC_3H_6N(CH_3)_2$$

and 4240 grams of dimethyl formamide. The solution was stirred and heated at about 100° C. Periodic samples were taken to check the degree of quaternization as measured by increasing water solubility. After reaction for 72 hours the 50 weight percent solids solution in dimethyl formamide was filtered. This product showed good surfactant properties. Upon prolonged standing, the quaternary salt

polymerized slowly to a higher molecular weight product which was relatively insoluble in xylene hexafluoride and which dried to a water and oil resistant film on a solid substrate.

EXAMPLE 2

Mid-Continent asphalt (ASTM D5–25 penetration: 20) was heated to 400° F. and approximately 0.1 percent by weight of the quaternary salt of Example 1 was added. The asphalt was then coated onto pieces of rag-content felt. A control sample of the same asphalt was prepared without the use of the quaternary salt anti-migration agent. The asphalt-coated felt samples were then exposed at 160° F. under an ultraviolet lamp for 24 days and washed each day with methyl alcohol. The results of the weathering tests are shown in Table I under "Weatherability." Substrate tests were also made after four days. The test samples for this test were made similarly to the sample for the weatherability tests, except that the coated felt was reheated and then coated with roofing granules (mineral). The samples were then placed in an infrared oven for four days at 160° F. and rated on the amount of the discoloration of the roofing granules that occurred at the end of the four day period. Rating numbers are from 1 to 10, 1 being the best rating (least discoloration) and 10 being the worst rating (most discoloration).

Table I

| Sample | Anti-migration agent | Weatherability | Stain |
| --- | --- | --- | --- |
| Control | | Badly weathered, many cracks, very brittle. | 9 |
| Test | Yes | Excellent | 1 |

EXAMPLE 3

Rag-content felt used as a backing for linoleum was saturated with a Mid-Continent asphalt (ASTM D5–25 penetration: 21). The asphalt-felt backing was heated to about 320° F. to cause the asphalt to soften. A 0.002 weight percent solution of the quaternary salt of Example 1 was swabbed onto the molten asphalt to dissolve the quaternary salt therein. The asphalt-felt was cooled and allowed to dry. Talc was dusted onto the surface of the dried and treated felt, as well as on a control sample which was similarly prepared as above except no anti-migration agent, i.e. quaternary salt, was dissolved in the asphalt. The control sample and the treated sample were exposed in an oven at 200° F to 220° F. for periods of 2 hours, 1 day and 1 week. The samples of felt were folded in half, and approximately 3½ pound per square inch weight placed upon the folded felt during the heating periods. Table II shows the test results.

Table II

| Sample | Appearance of talc after— | | |
| --- | --- | --- | --- |
| | 2 hours | 1 day | 1 week |
| Control | Slight stain | Black | Black. |
| Treated sample | Unstained | Slight stain | Slight stain. |

The data correlates well with the results of asphalt linoleum rolled up tightly or stacked asphalt tile. The performance indication was exceptional for the treated samples.

EXAMPLE 4

This example illustrates the improvement in pressure-sensitive adhesive tapes utilizing the quaternary salts of this invention in the tape backing.

100 parts by weight of a powdered copolymer of vinyl chloride and vinyl acetate (97:3 weight ratio) were admixed with 35 parts by weight of dioctyl phthalate and 1.5 parts by weight of di-basic lead phosphite and were thoroughly blended in a blending mill. The mixture was then divided into parts, one part being used as the control sample. Into another part was added 0.06 weight percent of the fluorinated quaternary salt of Example 1. Both samples were then extruded into film, and the film was coated with a styrene-butadiene copolymer rubber adhesive. The films were then rolled and tested for unwind characteristics. In addition the films were tested for adhesion to steel at fast speed both with fresh tape and with aged tape. The results were very significant in regard to the treated film, which exhibited a very smooth roll unwind. As compared to the untreated control sample, the treated film had an increase of 45 percent in adhesion to steel at fast speeds on fresh samples and 21 percent on aged samples.

EXAMPLE 5

A polymer of 2-chloroethyl acrylate was made with the following charge:

100 parts by weight 2-chloroethyl acrylate
180 parts by weight distilled water
4 parts by weight Duponol ME
0.2 part by weight potassium persulfate
4 parts by weight ter-dodecyl mercaptan The bottle was flushed with nitrogen and tumbled in a 50° C. controlled temperature bath for 22 hours. The resulting emulsion was coagulated in methanol, washed with distilled water and methanol and dried. Conversion was 82.9%. The polymer was soft, of low molecular weight, and had an inherent viscosity of 0.180 in benzene.

Fifty and one-hundred mole percent of

were added to solutions of the polymer in dimethyl formamide, diluted to give 50% total solids. These were reacted in a 95° C. bath for 65 hours. The resultant quaternized polymers were miscible with water in all proportions. Fabrics treated with either the formamide or the water solution of the polymer show both water and oil repellent properties.

EXAMPLE 6

Two latices were prepared using the following recipes:

|  | A | B |
|---|---|---|
|  | Grams | Grams |
| $C_8F_{17}SO_2N(C_2H_5)C_2H_4OCOC(CH_3)=CH_2$ | 12.5 | 12.5 |
| Chloroprene | 12.5 | 12.5 |
| $H_2O$ | 31.5 | 31.5 |
| Acetone | 13.5 | 13.5 |
| Polyoxyethylene fatty alcohol emulsifier | 0.75 | 0.75 |
| $C_7F_{15}CONHC_3H_6N(CH_3)_2$ quaternized with $ClC_2H_4OCOCH=CH_2$ | 0.5 |  |
| $C_8F_{17}SO_2NHC_3H_6N(CH_3)_2 \cdot HCl$ |  | 0.5 |
| $K_2S_2O_8$ | 0.05 | 0.05 |
| Tertiary dodecyl mercaptan | 0.075 | 0.075 |
| n-Octyl mercaptan | 0.075 | 0.085 |

Two 4-oz. bottles were charged with above ingredients flushed with $O_2$-free $N_2$, sealed and rotated end-over-end in a 50° C. water bath for 15 hours. At the end of this time, both latices were milky and contained a small amount of precoagulum. Latex A contained 30.7% polymer solids in latex and latex B contained 34.3%. Each latex was used to treat cotton fabric by padding the cotton with dilute latex and heating 10 min. at 150° C. The following properties were observed:

*Table III*

| Treatment | Fabric | Percent polymer solids in pad bath | Oil rating | Spray rating |
|---|---|---|---|---|
| Latex A | Cotton print cloth x | .58 | 70 | 90 |
|  | Cotton print cloth y | .58 | 80 | 100 |
|  | Cotton print cloth x | .87 | 90 | 100 |
|  | Cotton print cloth y | .87 | 80 | 100 |
| Latex B | Cotton print cloth x | .58 | 60 | 50 |
|  | Cotton print cloth y | .58 | 80 | 80 |
|  | Cotton print cloth x | .87 | 80 | 90 |
|  | Cotton print cloth y | .87 | 80 | 100 |

EXAMPLE 7

To a flask was charged 11.68 grams (.02 M) $C_8F_{17}SO_2NHC_3H_6N(CH_3)_2$, 2.68 grams (.02 M) chloroethyl acrylate and 14.86 grams dimethyl formamide. After heating for 72 hours at 100° C. the solution was complete, indicating essentially complete quaternization. The resulting product had the formula

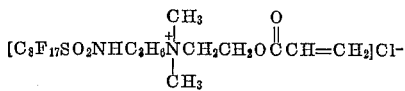

The solution of this product in dimethyl formamide is useful in inhibiting the evaporation of gasoline and may also be added to asphaltic products as an anti-migration agent.

EXAMPLE 8

A newly made solution in dimethyl formamide of the quaternary salt of Example 1 was diluted to 1% solids by weight in water. A clean glass slide was immersed into the solution and slowly retracted therefrom. A solution in dimethyl formamide of the quaternary salt of Example 1, which quaternary had been allowed to polymerize upon standing at room temperature, was similarly diluted to 1% solids by weight in water and similarly coated onto a clean glass slide. Both slides were then immersed in 15° C. running water for a period of two hours. After both slides had dried, the contact angle of hexadecane on each slide was determined. The contact angle on the slide with the freshly prepared quaternary was 16°, and the contact angle of the slide prepared with the polymerized quaternary was 34°. These results indicate the stronger adhesion to glass and the water resistance of the polymerized sample as compared to the unpolymerized monomer.

Various other embodiments and modifications of this invention which will be apparent to those skilled in the art from the foregoing disclosure are considered to be within both the spirit and the scope of this invention.

I claim:

1. A water miscible polymer having, in an occurrence sufficient for water miscibility, recurring groups of the formula

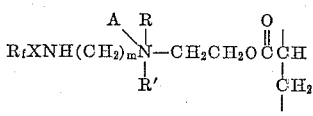

wherein X is selected from the group consisting of —$SO_2$— and

m is an integer from 2 to 11, R and R' are stable oleophobic groups having from 1 to 17 carbon atoms, $R_f$ is a perfluoroaliphatic radical having from 1 to 18 carbon atoms, and A is an anion selected from the group consisting of a halide and a hydroxyl ion.

2. The polymer of claim 1 wherein X is —$SO_2$—.

3. The polymer of claim 1 wherein X is

4. The polymer of claim 1 wherein A is a halide ion.
5. The polymer of claim 1 wherein A is a chloride ion.
6. The polymer of claim 1 wherein A is a hydroxyl ion.
7. The polymer of claim 1, wherein R and R' are alkyl radicals having from 1 to 6 carbon atoms.
8. An article coated with the polymer of claim 1.
9. A glass surface coated with the polymer of claim 1.
10. A water solution of the polymer of claim 1.

References Cited by the Examiner

UNITED STATES PATENTS

| 2,759,019 | 8/56 | Brown et al. | 260—556 |
| 2,764,603 | 9/56 | Ahlbrecht | 260—556 |
| 2,803,656 | 8/57 | Ahlbrecht el al. | 260—556 |
| 2,862,894 | 12/58 | Hwa | 260—89.7 XR |

JOSEPH L. SCHOFER, *Primary Examiner.*

WILLIAM H. SHORT, *Examiner.*

UNITED STATES PATENT OFFICE
CERTIFICATE OF CORRECTION

Patent No. 3,207,730

September 21, 1965

Richard A. Guenthner

It is hereby certified that error appears in the above numbered patent requiring correction and that the said Letters Patent should read as corrected below.

Column 2, lines 26 to 29, the formula should appear as shown below instead of as in the patent:

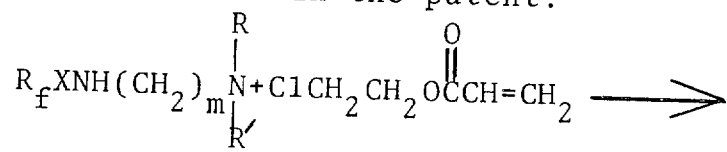

Signed and sealed this 7th day of February 1967.

(SEAL)
Attest:

ERNEST W. SWIDER
Attesting Officer

EDWARD J. BRENNER
Commissioner of Patents